United States Patent [19]

Stone

[11] 4,251,635

[45] Feb. 17, 1981

[54] PRODUCTION OF POLYURETHANE FOAM OF REDUCED TENDENCY TO FORM EMBERS WHEN BURNED

[75] Inventor: Herman Stone, Hazleton, Pa.

[73] Assignee: Tenneco Chemicals, Inc., Saddle Brook, N.J.

[21] Appl. No.: 76,877

[22] Filed: Sep. 19, 1979

[51] Int. Cl.³ ............................ C08G 18/14; C08G 18/30
[52] U.S. Cl. ........................................ 521/113; 521/99; 521/107; 521/172
[58] Field of Search ................................ 521/107, 113

[56] References Cited

U.S. PATENT DOCUMENTS

| | | | |
|---|---|---|---|
| 3,121,699 | 2/1964 | Merriman | 521/113 |
| 3,165,483 | 1/1965 | Gemeinhardt et al. | 521/113 |
| 3,179,626 | 4/1965 | Beitchman | 521/113 |
| 3,681,273 | 8/1972 | Kelly | 521/177 |
| 3,803,063 | 4/1974 | Krentz | 521/137 |
| 4,045,378 | 8/1977 | Maxwell | 521/113 |
| 4,055,522 | 10/1977 | Oshida et al. | 521/113 |
| 4,139,501 | 2/1979 | Rudner et al. | 521/136 |

*Primary Examiner*—H. S. Cockeram
*Attorney, Agent, or Firm*—James P. Scullin

[57] ABSTRACT

Flexible polyurethane foam having reduced tendency to form burning embers when it is ignited and burned is provided by incorporating into the reaction mixture before foaming a ketone or benzaldehyde.

In a preferred embodiment, flexible polyurethane foam of increased flame retardance is provided by also incorporating a flame retardant into the reaction mixture before foaming.

12 Claims, No Drawings

PRODUCTION OF POLYURETHANE FOAM OF REDUCED TENDENCY TO FORM EMBERS WHEN BURNED

BACKGROUND OF THE INVENTION

1. Field of the Invention

This invention relates to improvements in flexible, resilient, polyurethane foams, and in particular to improvements in the characteristics of such foams when subjected to fire. Flexible resilient polyurethane foams are made by the reaction of polyols and organic polyisocyanates in the presence of a blowing agent and one or more catalysts. The foams find a variety of uses, such as carpet underlay, textile innerlining, mattresses, pillows, furniture padding, cushions, automobile crash pads, and insulation. Unless formulated with special additives, polyurethane foams burn readily when ignited. It is known in the art to add various flame retardant chemicals to polyurethane foam-forming reaction mixtures, in particular to add halogenated esters of phosphorus. This has resulted in some improvement in the flammability properties, the extent of burning after ignition being reduced and the foams may even be made self-extinguishing to some degree; but while combustion does occur the foam melts and drips flaming embers which may ignite other flammable materials in the vicinity and thus cause the fire to spread. In order to overcome this problem, other additives have been added to polyurethane foam-forming reaction mixtures to render the finished foams intumescent, or to produce a char, once they have been ignited. Such foams are less prone to the development of flaming, dripping, embers during combustion, and may produce a char which acts as a thermal insulation and thus aids in preventing the spread of a fire.

2. Description of the Prior Art

In U.S. Pat. No. 3,681,273 the use of a mixture of a nitrogen and phosphorus containing compound such as monoammonium phosphate, melamine phosphate, or urea phosphate, and an N-alkylol substituted polyalkylene polyamine as an additive to conventional flexible polyurethane foam reaction mixtures is disclosed. The resultant foams are flame-retardant, intumescent, and non-burning.

U.S. Pat. No. 3,803,063 discloses a flexible polyurethane foam reaction mixture containing an additive comprising a nitrogen and phosphorus containing compound such as monoammonium phosphate, or an ammonium phosphate and a polycondensate of polymerized unsaturated fatty acids with aliphatic amines.

In U.S. Pat. No. 4,139,501, Rudner, Noone and Pauly disclose flexible polyurethane foams having reduced tendency to form burning embers when ignited and burned, produced by incorporating into the foam-forming reaction mixture a melamine derivative wherein one or more hydrogen atoms have been replaced by hydroxymethyl and/or lower alkoxymethyl groups. Alternatively, a halogenated phosphorus ester can also be included in the reaction mixture.

SUMMARY OF THE INVENTION

This invention provides flexible, resilient, polyurethane foam with reduced tendency to form burning, dripping, embers during combustion. These foams are substantially equal in non-drip properties to those provided by the disclosure of U.S. Pat. No. 4,139,501, and are obtained at lower cost. This improvement is provided by adding to a conventional polyurethane foam-forming reaction mixture at least one drip inhibitor such as benzaldehyde or a ketone. The drip inhibitors are generally less costly per weight and generally effective in lesser amounts as compared with the melamine derivatives used in the method of U.S. Pat. No. 4,139,501. The foam-forming reaction mixture also contains a halogenated phosphate ester as a flame retardant.

The novel products of this invention, rather than being stiff and rigid, retain substantially the flexibility, resilience, cell structure, permeability, and hand of conventional flexible polyurethane foams which do not contain the drip inhibitors employed in the present process. As a consequence, the foams of this invention can be used in most or all of the applications where conventional flexible foams have heretofore been used. These novel foams can, if desired, be peeled, split, or sliced into sheets of any desired thickness using techniques well-known in the art, and the flexible sheets also can be rolled up for convenient storage and transportation. Like conventional flexible polyurethane foams, the products of the present process can be laminated to textiles or plastic substrates by conventional methods, such as flame-lamination or by means of adhesives.

Although the foams of this invention have the appearance and flexibility of conventional foams, once they are ignited they have a greatly reduced tendency to form burning embers. As is well known, one of the disadvantages of conventional polyurethane foams and other synthetic polymers is the fact that when they are ignited they tend to melt and form burning embers which can drip and cause the spread of flames to other nearby materials. Even when such conventional materials contain halogenated phosphorus esters as flame-retardants they can still produce smoldering, dripping embers which can ignite nearby materials which are not flame-retardant. These disadvantages are substantially overcome by the products of the process of the present invention.

DETAILED DESCRIPTION OF THE INVENTION

The objective of this invention is accomplished by incorporating into an otherwise conventional polyurethane foam-forming reaction mixture a least one ketone or benzaldehyde, or mixtures thereof. The preferred ketones are those that contain from about 5 to about 12 carbon atoms, such as diethyl ketone, methyl isobutyl ketone, ethyl butyl ketone, acetophenone, propiophenone, diisobutyl ketone, isobutyl heptyl ketone, cyclohexanone, mesityl oxide, isophorone, 2,4-pentanedione and diacetone alcohol, by way of examples. The preferred drip inhibitors in the practice of this invention are benzaldehyde, methyl isobutyl ketone, and cyclohexanone.

Although I prefer to use a single drip inhibitor, a mixture of two or more can be used if desired, without departing from the scope of of this invention.

The amount of the drip inhibitor to be added is not critical and can be varied over a range of from about 0.8 to about 20 parts by weight per 100 parts by weight of polyol in the reaction mixture. A preferred range is from about 1 to about 10 parts by weight, and the most preferred range is from about 2 to about 6 parts by weight.

Although one or more drip inhibitors can be used alone in order to reduce the tendency to form flaming, dripping embers, I prefer to also include a flame retardant in the foam-forming reaction mixture. Suitable flame retardants are those conventionally used in the art of making flexible polyurethane foams, and include tri-esters of phosphoric acid, halogenated tri-esters of phosphoric acid, halogenated hydrocarbons, and the like.

Examples of suitable flame retardants are: tris (1,3-dichloropropyl) phosphate, tris (2,3-dibromopropyl) phosphate, 2,2-bis(chloromethyl)-1,3-propylene bis [di (2-chloroethyl) phosphate], tris (2-chloroethyl) phosphate, tris (2-chloropropyl) phosphate, bis (dichloropropyl) tribromoneopentyl phosphate, tricrecyl phosphate, cresyl diphenyl phosphate, chlorinated paraffin, and brominated paraffin. I prefer to use halogenated phosphates, and particularly prefer tris (1,3-dichloropropyl) phosphate. Although a single flame retardant is preferred from the stand point of simplicity of formulation, mixtures of two or more of the same type or of different types may be found to give improved performance in some cases and such mixtures are included in the scope of this invention. The amount of flame retardant is not critical, and can be varied over a wide range such as from about 2 to about 30 parts by weight per 100 parts by weight of polyol in the reaction mixture. It is preferred to use from about 5 to about 20 parts by weight, and particularly preferred to use from about 7 to about 20 parts by weight.

It will be understood by those skilled in the art that the amount of drip inhibitor, and of flame retardant, to be used will depend on the degree of drip inhibition and flame retardance desired for a given application. A suitable amount can be readily determined with only a minimum of experimentation.

The mixture to be foamed will include at least one polyol, at least one organic polyisocyanate, at least one blowing agent, and at least one catalyst. Alternatively, the mixture to be foamed can also comprise other known additives and compounding ingredients for the preparation of polyurethane foams. Such additives and ingredients include, by way of example, fillers, pigments or other colorants, surfactants, foam stabilizers, cell openers, lubricants, microbicides, and so forth.

The polyol can be one or more polyether polyols, one or more polyester polyols, or a mixture of one or more polyether polyols and polyester polyols.

The polyols suitable for use in the present invention can be polyether polyols, such as those made by the addition of an excess of 1,2-propylene-oxide to hexane triol, trimethylolpropane, glycerol, triethanolamine or a polyethylene glycol. Also, the polyols suitable for use in this invention can be polyester polyols or a mixture of polyester polyols and polyether polyols. The polyester polyol can be prepared, for example, by reacting a dicarboxylic acid, such as adipic acid, with a mixture of a diol, such as diethylene glycol, and a triol, such as glycerol.

The polyether polyol can also be selected from any of the wide variety of polyhydric polyether compounds available and conventionally used by the art for the preparation of flexible polyether-type polyurethanes. The most common polyether polyol compounds, the polyoxyalkylene polyether polyols, are generally prepared by the reaction of an alkylene oxide, such as 1,2-propylene-oxide, with a polyhydric initiator or starter. The polyhydric initiator or starter can be, for example, glycerol, trimethylolethane, trimethylolpropane, triethanolamine or a polyethylene glycol.

The alkylene oxides used in preparing the polyethers preferably are those which contain from two to four carbon atoms, for example, ethylene oxide, 1,2-propylene oxide, 1,2-butylene oxide, trimethylene oxide and tetramethylene oxide. Also useful are the poly(aralkylene ether) polyols which are derived from the corresponding aralkylene oxides such as, for example, styrene oxide, alone or mixed with an alkylene oxide. Generally, propylene oxide i.e., the 1,2-propylene oxide, and mixtures of 1,2-propylene oxide with ethylene oxide, are preferred for the preparing of the polyether polyol reactant.

The polyethers for use in the present invention preferably have a molecular weight of from about 500 to about 6500 and optimally of from about 2800 to about 4600 and an average hydroxy functionality of at least 2.5 to about 3.1.

The polyester polyol reactants useful in the present invention include any conventionally used in the preparation of flexible and semi-flexible urethane polymer foams. The polyhydric polyester reactant usually has a molecular weight of at least about 400 and optimally between about 500 and about 5000. The hydroxyl number of the compound is correspondingly in the range of from about 15 to about 300. The preferred average hydroxyl functionality for the polyester resins is from about 2.2 to 2.8.

The range of polyester polyol compounds useful for preparing the flexible polyurethane foams in the present inventions is well known to the art, and the polyester polyol compounds can be prepared by, for example, the reaction of a polyhydric alcohol with a polycarboxylic acid compound, each containing from two to about 36 or more carbon atoms in the molecule. The polycarboxylic acid includes such acid precursors as the corresponding acid anhydrides or acid halides or even, for example, alkyl esters. The preferred acids are the dicarboxylic acids containing from 4 to 36 carbon atoms in the molecule. Examples of such preferred carboxylic acid compounds which can be used include, for example, aromatic acids, such as phthalic acid, terephthalic acid, isophthalic acid tetrachlorophthalic acid, cycloaliphatic acids such as dimerized linoleic acid, maleated and fumarated resin acids, and cyclohexane-1,4-diacetic acid, but especially the aliphatic acids such as itaconic, oxydipropionic, succinic, glutaric, adipic, azelaic, suberic and sebacic acids, or combinations of such acids. The polyester polyols can also be prepared from the corresponding lactones, such as gamma-butyrolactone or epsiloncaprolactone, for example, by self-condensation on a diol-triol initiator.

The polyhydric alcohol used in the preparation of the polyester polyol is generally a mixture of a dihydric and a trihydric alcohol. Preferably, a mixture of polyols, the major portion having a functionality of two and the minor a functionality of three, is used. This mixture of di- and tri-functional polyols is utilized to give an average functionality of between two and three. A functionality of greater than two is desirable to provide cross-linking in the reaction between the polyester polyol and the polyisocyanate to form a flexible, but strong foam. It has been found to be preferable to obtain this additional functionality by using trihydric or higher polyols in a minor amount when forming the polyester polyol.

It is recognized that certain compounds which are considered by those skilled in the art as polyester resins also contain ether linkages e.g., esters prepared from dipropylene glycol. However, the primary character of such resins is considered to be that of an ester.

The organic polyisocyanates useful in the present invention are also conventional. They contain at least two isocyanate groups per molecule. Preferably, the isocyanate mixture selected has an isocyanate functionality of from 2.0 to 3.0. The useful isocyanates are the aromatic polyisocyanates alone or admixed with aliphatic, cycloaliphatic or heterocyclic polyisocyanates.

The aromatic diisocyanates are generally the least expensive and most suitable polyisocyanates available. The aromatic diisocyanates, especially the toluene diisocyanate isomers, are used commercially in the preparation of foam by the one-shot, continuous slab-stock process. However, for certain purposes, other polyisocyanates, especially the aliphatic, aralkyl and cycloalkyl polyisocyanates, have valuable properties and can be used, if desired, in admixture with, e.g. toluene diisocyanates. The aralkyl, aliphatic and cycloaliphatic polyisocyanates are especially useful when resistance against degradation and discoloration due to oxidation or light is needed. The non-aryl polyisocyanates are generally not useful alone, but can be used in combination with the other types for special purposes.

Suitable organic polyisocyanates include, for example, n-butylene diisocyanate, methylene diisocyanate, m-xylyl diisocyanate, p-xylyl diioscyanate, cyclohexyl-1, 4-diisocyanate, dicyclohexylmethane-4, 4'-diisocyanate, m-phenylene diisocyanate, p-phenylene diisocyanate, 3-(alphaisocyanatoethyl)-phenyl isocyanate, 2,6-diethylbenzene-1, 4-diisocyanate, diphenyldimethylmethane-4, 4'-diisocyanate, ethylidene diisocyanate, propylene-1,2-diisocyanate, cyclohexylene-1, 2-diisocyanate, 2,4-toluene diisocyanate, 2,6-toluene diisocyanate, 3,3'-dimethyl-4'-biphenylene diisocyanate, 3,3'-dimethoxyl-4,4'-biphenylene diisocyanate, 3,3-diphenyl-4,4'-biphenylene diisocyanate, 4,4-biphenylene diisocyanate, 3,3'-dichloro-4,4'-biphenylene diisocyanate, 1,5-naphthalene diisocyanate, isophorone diisocyanate, m-xylylene diisocyanate, triazine triisocyanate, triketotrihydrotris(isocyanatophenyl) triazine and tris(isocyanatephenyl) methane.

Generally, in carrying out the urethane polymerization reactions, the only significant groups in the reactant compounds are the isocyanate groups and active hydrogen groups which are reactive therewith. Acyclic, alicyclic, aromatic and heterocyclic radicals are all possible substituents on the active hydrogen and polyisocyanate reactants.

The preferred blowing agent for general use in the production of the flexible polyurethane foam is water. The advantages of using water are low cost and the stability which the use of water adds to the foam-making. The water-isocyanate reaction gives not only gas for blowing, but also produces urea-containing polymer very quickly, contributing materially to early polymer strength needed to hold the gas inside, to form foam. Generally, when water is used, it is present in proportions of from about 0.5 to about 6 weight percent of water based on the total weight of the reacting polyols. Blowing agents which do not react with the isocyanate can be used as an adjunct with water or as a total replacement of water. These include compounds which are vaporized at the temperature produced by the exotherm of the isocyanate-reactive hydrogen reaction. The varous blowing agents are well known in the art and constitute no part of the present invention. Other blowing agents that are preferably used by the art include certain halogen-substituted aliphatic or cyclo-aliphatic hydrocarbons having boiling points between about $-40°$ C. and $+40°$ C., including methylene chloride; the volatile fluorocarbons, such as trichloromonofluoromethane, dichlorodifluoromethane, and 1-chloro-2-fluoroethane; low boiling hydrocarbons such as n-propane, cyclopropane, butane, isobutane, pentane, hexane, cyclohexane and their mixtures and the like.

As is conventional in the art pertaining to the manufacture of polyurethane foam, the reaction mixture will also contain a catalyst. Catalysts suitable for use in this invention are conventional ones in the polyurethane foam art, and include tertiary amines and metallic compounds. Useful tertiary amines include: N-alkylmorpholines such as N-ethylmorpholine; N,N-dialkylcyclohexylamines where the alkyl groups are methyl, ethyl, propyl, butyl, etc.; trialkylamines such as triethylamine, tripropylamine, tributyamine, triamylamine, etc.; triethylenediamine, bis (2-dimethylaminoehtyl) ether; N,N-dimethlaminoethyl-N'N'-dimethylaminopropyl ether the tertiary amine sold by Jefferson Chemical Co., under the name THANCAT DD: and other tertiary amines well known in the art. Useful metal compounds include those of bismuth, lead, titanium, iron, antimony, uranium, cadmium, cobalt, aluminum, mercury, zinc, nickel, cerium, vanadium, copper, manganese, zirconium, tin, and others. Tin compounds are particularly useful, some examples being stannous octoate, stannous 2-ethylhexoate, stannous oleate, dibutylin bis (2-ethylhexoate), and dibutyltin dilaurate. The levels of catalyst used are conventional.

As is also conventional in the art pertaining to the manufacture of polyurethane foam, the reaction mixture can also contain a surfactant if desired, preferably an organosilicon surfactant, also commonly termed silicone surfactant. As is well known in the art, silicone surfactants perform several functions in the formation of polyurethane foams, imcluding the prevention of collapse during foam rise and the control of cell size. The organosilicon surfactants contain one or more hydrophobic groups and one or more hydrophilic groups. The hydrophobic groups comprise a plurality of silicon atoms, generally in the form of repeating siloxane groups. The hydrophilic groups generally consist of a plurality of oxalkylene radicals in the form of a chain of repeating units. In one type of silicone surfactant, the backbone of the molecule comprises a chain of siloxane groups to which are attached pendant polyoxyalkylene hydrophilic groups. In another type, a chain of alternating polysiloxane and polyoxyalkylene segments form the backbone of the molecule. In a third, less common type, the polymer backbone is formed by a carbon-to-carbon chain to which are attached silicon atoms and long chain hydrophilic groups. The various types of organosilicon surfactants for use in the manufacture of polyurethane foam are well known in the art, described extensively in the literature, and sold commercially. Some representative organosilicon surfactants which are suitable for use in the present invention are: L-520, L-540, and L-5720 manufactured by Union Carbide Corp.; and DC-191, DC-196 and DC-198 manufactured by Dow Corning. The amount of organosilicon surfactant used in this invention will generally be in the range of from about 0.01 to about one part by weight per 100 parts by weight of polyol, although lesser or greater amounts can be used, if desired.

The polyurethane foams according to this invention can be prepared by any of the methods known in the art, including prepolymer, quasi-prepolymer, and one-shot, batchwise or continuous. It is preferred to prepare them continuously by the one-shot method in the form of large buns having a rectangular or circular cross-section which can then be split or peeled into sheets of suitable thickness. For example, buns having a circular cross-section and suitable for peeling are disclosed in U.S. Pat. No. 3,874,988, to Buss et al. The polyurethane foams can be essentially completely open-celled, such as those disclosed in U.S. Pat. No. 3,748,288 to Winkler et al or U.S. Pat. No. 3,884,848 to Ricciardi et al, or reticulated foams made by any of the reticulation methods known in the art. The foams can also be partly open-celled, or predominently closed-celled.

Of the following examples, one of which is a comparative example according to the prior art and others of which are according to the present invention, those made according to the present invention are illustrative thereof but not limitative thereof. In these examples, all amounts shown are parts by weight.

The foams were evaluated by a modification of the procedure of UL 94, Standard for Tests for Flammability of Plastic Materials for Parts in Devices and Appliances, published by Underwriters Laboratories Inc. The modification of UL 94 was in the measurement of flame time. The standard test calls for starting to count flame time 60 seconds after ignition, whereas in the procedure used herein flame time was counted from the start of ignition.

The following are the identities of the various ingredients used in the examples. TDI stands for tolylene diisocyanate (also called toluene diisocyanate). The numbers which follow "TDI" indicate the ratio of the 2,4 and 2,6 isomers (e.g., TDI 65/35 is a 65/35 mixture of tolylene 2,4-diisocyanate and tolylene 2,6-diisocyanate). A 390 is a surfactant comprised of a mixture of modified fatty acid esters plus a silicone, sold by Witco. NEM is N-ethylmorpholine, sold by Jefferson Chemical as THANCAT NEM. DM-16D is n-hexadecyldimethylamine, sold by Lonza as BAIRCAT B-16. NCM is N-cocomorpholine, sold by Lonza as BAIRCAT NCM. C-2 is stannous octoate, sold by M & T Chemicals as FOMREZ C-2. KAYDOL Is a white mineral oil, sold by Witco. 73D is a dispersion of black pigments in an organic vehicle (black paste). FR-2 is tris (1,3-dichloropropyl) phosphate sold by Stauffer Chemical as FYROL FR-2.

TABLE I

| Example | 1 | 2 | 3 | 4 |
| --- | --- | --- | --- | --- |
| Polyester prepared from diethylene glycol, adipic acid, and trimethylolethane; OH no. 56 | 100.0 | 100.0 | 100.0 | 100.0 |
| TDI 65/35 | 50.1 | 50.1 | 50.1 | 50.1 |
| Black Dispersion 73D | 7.45 | 7.45 | 7.45 | 7.45 |
| A-390 | 2.0 | 2.0 | 2.0 | 2.0 |
| Water | 3.7 | 3.7 | 3.7 | 3.7 |
| NCM | 0.8 | 0.8 | 0.8 | 0.8 |
| KAYDOL | 0.2 | 0.2 | 0.2 | 0.2 |

TABLE I-continued

| Example | 1 | 2 | 3 | 4 |
| --- | --- | --- | --- | --- |
| NEM | 0.5 | 0.5 | 0.5 | 0.5 |
| DM-16D | 0.3 | 0.3 | 0.3 | 0.3 |
| C-2 | 1.5 | 1.5 | 1.5 | 1.5 |
| FR-2 | 20.0 | 20.0 | 20.0 | 20.0 |
| Methyl Isobutyl Ketone | — | 5.0 | — | — |
| Cycohexanone | — | — | 5.0 | — |
| Benzaldehyde | — | — | — | 5.0 |

The index of these examples was 111. Example 1 is a comparator, made accordiing to the prior art and not containing a drip inhibitor, and Examples 2–4 are according to the invention. Each of the examples yielded a flexible, resilient, foam having a uniform cell structure. The flammability characteristics of the foams were evaluated by a modified UL94 procedure, and the results are summarized in Table II.

TABLE II

| Example | 1 | 2 | 3 | 4 |
| --- | --- | --- | --- | --- |
| Average Time of Burn, sec. | 58.7 | 71.9 | 60.5 | 56.3 |
| Average Extent of Burn, in. | 1.95 | 2.85 | 2.15 | 2.03 |
| Drip Formation | Yes | No | No | No |
| Char Formation | No | No | No | No |

During combustion, dripping embers formed from the product of Example 1 and no char formed. Although the products of Example 2–4 also did not form a char during combustion, they were free from dripping, burning, embers.

What is claimed is:

1. In a process for the manufacture of flexible resilient polyurethane foam by the reaction of at least one polyol and at least one organic polyisocyanate in the presence of at least one blowing agent and at least one catalyst, the improvement comprising the steps of incorporating into the mixture to be foamed at least one drip inhibitor selected from ketones having from about 5 to about 12 carbon atoms, in amount sufficient to reduce the formation of dripping, burning, embers when said foam is burned, and at least one flame retardant in amount sufficient to increase the flame retardant properties of said foam.

2. The process of claim 1 wherein the drip inhibitor is methyl isobutyl ketone.

3. The process of claim 1 wherein the drip inhibitor is cyclohexanone.

4. The process of claim 1 wherein said polyol is a polyester polyol.

5. The process of claim 1 wherein said flame retardant is a halogenated ester of phosphoric acid.

6. The process of claim 1 wherein said flame retardant is tris (1,3-dichloropropyl) phosphate.

7. The product of the process of claim 1.

8. The product of the process of claim 2.

9. The product of the process of claim 3.

10. The product of the process of claim 4.

11. The product of the process of claim 5.

12. The product of the process of claim 6.

* * * * *